United States Patent [19]

d'Arras

[11] 4,112,544
[45] Sep. 12, 1978

[54] TENDERIZER FOR BUTCHER'S MEAT

[75] Inventor: Philippe d'Arras, Paris, France

[73] Assignee: Societe Coupax, Selles Sur Cher, France

[21] Appl. No.: 755,825

[22] Filed: Dec. 30, 1976

[30] Foreign Application Priority Data

Jan. 8, 1976 [FR] France ............................ 76 00328

[51] Int. Cl.² ............................................. A22C 9/00
[52] U.S. Cl. ............................................. 17/25; 17/30
[58] Field of Search ................. 17/75, 25, 28, 30, 31; 30/358, 366, 368, 122, 164.5, 164.8, 164.9, 329, 332, 333, 337, 338

[56] References Cited
U.S. PATENT DOCUMENTS

| 207,107 | 8/1878 | Davies | 17/30 |
| 735,727 | 8/1903 | De Woody | 17/30 |
| 1,170,772 | 2/1916 | Mitchel | 17/30 |
| 1,965,462 | 7/1934 | Irwin | 17/25 |
| 1,996,949 | 4/1935 | Bosworth et al. | 17/30 |
| 2,184,450 | 12/1939 | Elliott | 17/30 |
| 2,293,094 | 8/1942 | Abbott | 17/25 |
| 2,491,575 | 12/1949 | Nelson | 30/337 |
| 2,594,174 | 4/1952 | Johnson | 17/30 |
| 3,581,651 | 6/1971 | Johnson | 17/30 |
| 3,583,025 | 6/1971 | Jaccard | 17/25 |

Primary Examiner—Russell R. Kinsey
Assistant Examiner—Paul J. Hirsch
Attorney, Agent, or Firm—Burgess, Ryan and Wayne

[57] ABSTRACT

This invention concerns a tenderizer to tenderize butcher's meat before consumption, comprising a base, the underside of which comes into contact with the meat, and contains parallel slots, the tenderizer having tenderizing blades which are partly embedded in a block of plastic fitting into and adapted to be removed from, a blade-holder, the block using positioning lugs interlocking with matching cavities in a recess.

2 Claims, 4 Drawing Figures

TENDERIZER FOR BUTCHER'S MEAT

This invention concerns an appliance to tenderize butcher's meat.

Many such devices already exist, but their dismantling and reassembly are usually time-consuming and quite difficult, which complicates cleaning and disinfection operations required for health reasons.

These devices contain series of needles or blades, which pierce the meat and divide or break up the muscular fibres, thereby making the meat more tender. Fragments of meat get into gaps in the device, particularly those between needles or blades. Careful cleaning is required to prevent these fragments, on which germs may have proliferated, from contaminating a subsequent piece of meat, which could be a health danger. The only way of reaching these gaps and removing the fragments of meat in them is to dismantle the device, particularly the blades.

A tenderizer does exist, which can be dismantled for cleaning. It comprises a base; the under-side of this, which comes into contact with the meat, comprises an area containing parallel slots, providing a passage for blades projecting from a component fixed to two handles and which slides on uprights fixed to the base. This component can move between a rest position; in which it is separated from the base and toward which it is biased elastically; in this position only the ends of the blades fit into the slots; in the other position, i.e. the perforating position, into which the component can be brought to be close to the base, against the elastic biasing force, the blades pass through the slotted surface and project beyond it.

These devices are time-consuming and quite difficult to dismantle and reassemble, which makes cleaning and disinfection operations very tedious. In addition, reassembly of components forming the parallel-slot area is very difficult, requiring particular care and attention.

Also in this existing device, blades form a series with elongated teeth, and they are placed side by side, being kept apart by a series of struts between them. The blades are held by transverse rods extending through the blades, the struts and the blade-holder. The blades are removed by withdrawing the rods from the component. Reassembly is quite long and difficult.

Similarly, the slots in the surface through which blades pass consist of gaps between a series of crosspieces placed side by side in a rectangular opening in the base, through the ends of which pass two transverse spindles, running along two opposite sides of this opening. Again, dismantling consists of removing the spindles, and reassembly is again a lengthy, difficult operation.

The purpose of this invention is to offer a device of this type, functioning on the same principle, but much easier to dismantle and reassemble, and therefore much easier to clean.

In the novel tenderizer, the blades are partly embedded in a block of plastic, fitting into a recess in the blade-holder and comprising positioning lugs which fit into corresponding cavities in the recess. This allows the block into which the blades on the sliding component are attached to be removed easily for cleaning.

According to another feature of the invention, the slots through which blades pass are defined in a plate forming a grid which is fitted removably into an opening provided in the base, one side of said grid forming the under-side of the device. This grid can be easily removed from the base for cleaning, making the operation much quicker.

It will be easier to understand the invention from the following description, given only by way of example, and with reference to the accompanying drawings wherein.

Figure 1:
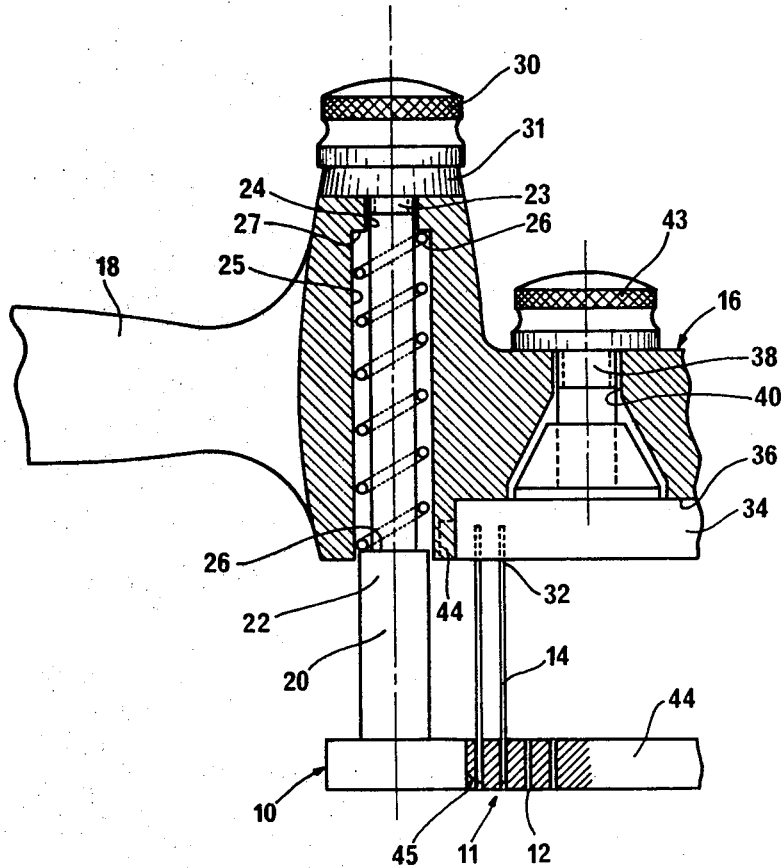
FIG. 1 is a part sectional view along a transverse vertical plane, of one embodiment of the new tenderizer.
Figure 2:
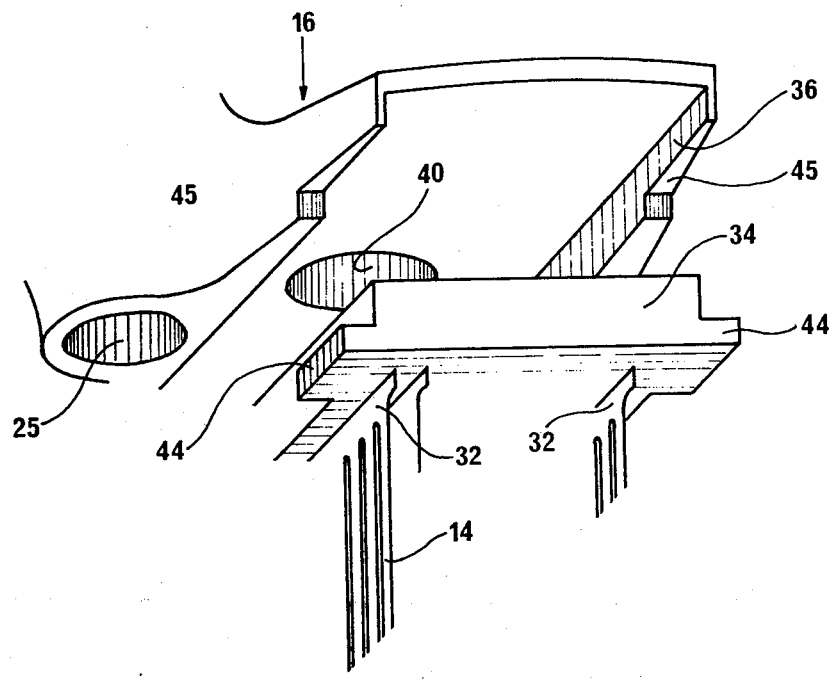
FIG. 2 is an exploded view in perspective of the device illustrated in FIG. 1, showing the blade-holder block and its positioning lugs.

In the embodiment shown in FIG. 1, the tenderizer comprises a base 10, the underside 11 of which comes into contact with the meat to be tenderized. This underside is provided with parallel slots 12, through which pass blades 14 mounted on a component 16 fixed to handles 18 (only one of which is shown here) and sliding on uprights 20 fixed to the base 10. In this example, the base 10 carries two uprights 20 with a wider lower end 22 and threaded upper end 23. The component 16 contains cylindrical holes 24 for these uprights, each comprising a wide section 25 providing room for a spring 26 surrounding the upright 20. The bottom end of this spring rests on a projecting shoulder 28 of the upright and the upper end rests on the neck 27 of the wide section 25. This spring tends to push the component 16 away from the base 10 and into contact with a nut 30 on the threaded end 23; an elastic ring 31 fits between this nut and the component 16. In this position, the component 16 is at rest.

The tenderizer comprises knives 14 formed from cut-out steel blades 32; in this invention, these blades, which are parallel, and separated from one another, are partly embedded in a parallelipiped-shaped block of plastic material. This block 34 fits into a recess 36 in the component 16, from which it can be removed. To this effect, there is a threaded metal rod 38 on the opposite side of the block from the blades, fixed permanently in the block during moulding, and which passes through a hole 40 in the component 16. A nut 43 is screwed on to this rod 38, holding the block 34 in position. In order to position the block exactly, it comprises projecting lugs 44 which fit into corresponding cavities 45 in the component 16.

Figure 3:
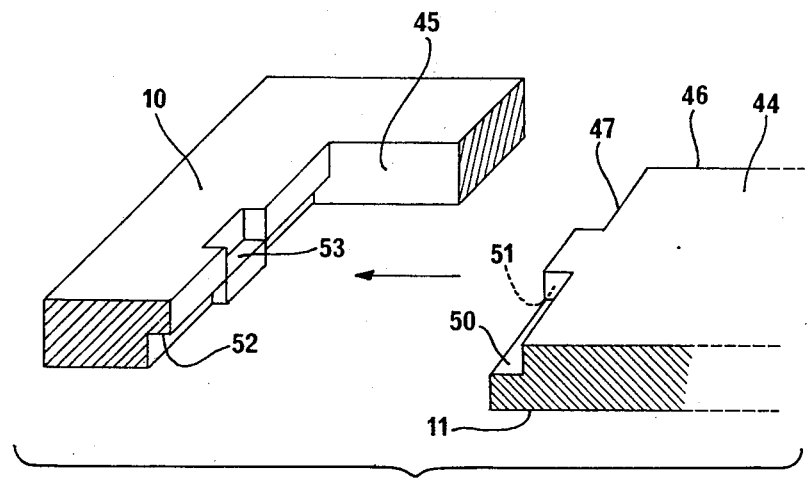
FIGS. 3 and 4 are two detailed views showing the system by which the grid and base are held together.

In the position illustrated in FIG. 1, the ends of the blades 14 fit into the slots 12 in the base 10 which comprises plate 19. These slots pass through plate 19 in the form of a grid. Plate 19 fits into and can be removed from an opening 21 in the base 10 (FIG. 3). The plate 19 is rectangular in this embodiment, two opposite sides 46 are smooth and flat, while the other two sides 47 and 48 contain recesses and projections which fit into corresponding recesses and projections in the sides of the opening 21.

FIG. 3 illustrates these projections and recesses on the side 47 of the plate 19. They consist of a partial recess forming on upward facing surface 50, which interlocks with a downward-facing surface 52 in a corresponding recess in the base opening. These recesses extend along the whole length of the sides of the plate and the opening, except for the central part, in which contrasting recesses provide a downward-facing surface 51 and a upward-facing surface 53. When the edges of the plate and opening are brought together, the two edges fit positively.

Figure 4:
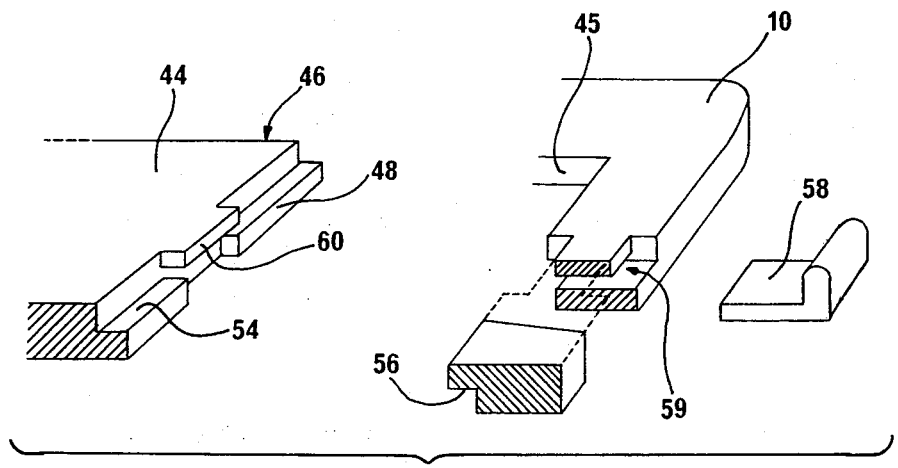

FIG. 4 illustrates the opposite side 48, on which the plate 19 contains a partial recess providing an upward-facing surface 54 which interlocks with the downward-facing surface 56 of a recess in the corresponding edge of the opening in the base 10.

To keep the grid in position in the opening, a sliding component 58 fits into an aperture 59 in the base 10, and the end of it slides under a projection 60 on the grid.

When the sliding component is removed, the grid can be separated from the base for cleaning. It is easy to reassemble: operations are simply reversed.

Naturally, the invention is in no way confined to above description: many alternative forms can be designed by those skilled in the art, depending on the particular applications envisaged, without any departure from the spirit of the invention.

The tenderizer according the present invention offers three main advantages:

(a) possibility of fast dismantling for easy cleaning;
(b) easy and proper supervision of health requirements: for example, on even dates, the blocks of plastic used in, which the blades are embedded, may be of a certain colour, and on uneven dates such blocks may be of another colour, thereby ensuring that they are regularly changed to guarantee adequate hygienic conditions;
(c) guarantee of proper use: since the blade unit is in one piece, the difficulty of reassembling blades one by one after cleaning is avoided, and particularly the risk of reassembling them in the wrong order no longer exists.

What is claimed is:

1. An appliance for tenderizing butcher's meat, comprising:

a base including an open frame and, a lower major surface for contacting the meat;

a plate having an apertured grid detachably interlocked with and forming a major portion of the base, said grid having a multiplicity of elongated slots oriented perpendicular to said lower major surface;

projections and recesses on two opposite edges of said plate and corresponding recesses and projections on the adjacent edges of the frame opening, and a sliding locking device on one edge of frame, to hold the plate in the base;

a main body having at least one handle, said body being disposed of near one side of said base remote from said lower major surface thereof;

an elongated upright secured to said base and slidably connected to said main body to permit linear sliding movement between said base and said body;

a spring for urging said upright away from said main body;

said main body having a recess therein for receiving a blade assembly;

a blade assembly comprising a block of plastic material having a mounting surface and an opposite blade holding surface said assembly being detachably interlockably secured to said main body with said block disposed in said recess and said mounting surface abutting a wall of said recess, said blade holding surface being generally parallel to said lower major surface of said base;

a corresponding multiplicity of elongated blades each having one end embedded in said plastic block at said blade holding surface thereof and a free end adjacent said lower major surface, each blade being in alignment with and extending through a corresponding aperture of said grid, whereby said main body may be moved toward said base to cause said blade to extend through said slots and beyond said lower major surface to tenderize said meat, said spring returning said body to a rest position wherein said free ends of said blades are disposed within said slots, and said plate and said blade assembly may be readily removed from said base and main body respectively for cleaning purposes.

2. A tenderizing appliance as defined in claim 1, comprising a threaded rod on the side of the plastic block opposite said blades, said rod fitting into a hole at the base of the opening into which the block fits, while the free end of said rod projects from the main body, and a nut screwed onto said rod so as to contact the main body.

* * * * *

UNITED STATES PATENT OFFICE
CERTIFICATE OF CORRECTION

Patent No. 4,112,544      Dated September 12, 1978

Inventor(s) Philippe d'Arras

It is certified that error appears in the above-identified patent and that said Letters Patent are hereby corrected as shown below:

FIG. 1:

Change numeral "26" to --28--.
    Change numeral "44" to --19--.
    Change numeral "45" to --21--.

FIG. 2:

Extend line from numeral "45".

FIG. 3:

Change numeral "44" to --19--
    Change numeral "45" to --21--.

FIG. 4:

Change numeral "44" to --19--.
    Change numeral "45" to --21--.

UNITED STATES PATENT OFFICE
CERTIFICATE OF CORRECTION

Patent No. 4,112,544            Dated Sept. 12, 1978

Inventor(s) Philippe d'Arras

It is certified that error appears in the above-identified patent and that said Letters Patent are hereby corrected as shown below:

FIGS 3 AND 4:

Add brackets thereto. (applies to Grant only)

Signed and Sealed this

Sixth Day of March 1979

[SEAL]

Attest:

RUTH C. MASON
*Attesting Officer*

DONALD W. BANNER
*Commissioner of Patents and Trademarks*